Figure 1:
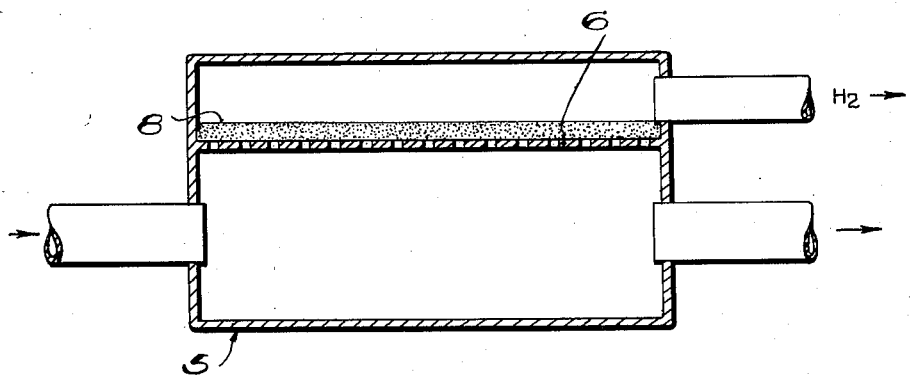

Feb. 10, 1953

J. W. TETER 2,627,933

AEROGEL DIFFUSION UNIT

Filed June 28, 1947

INVENTOR

John Watson Teter.

BY Adams, Forward & McLean

ATTORNEY

Patented Feb. 10, 1953

2,627,933

UNITED STATES PATENT OFFICE 2,627,933

AEROGEL DIFFUSION UNIT

John Watson Teter, Chicago, Ill., assignor to Sinclair Refining Company, New York, N. Y., a corporation of Maine Application June 28, 1947, Serial No. 757,904

1 Claim. (Cl. 183—2)

The present invention relates to improvements in the production of gasoline range hydrocarbon fractions of high anti-knock value by the conversion of hydrocarbon oils, and more particularly to a hydrocracking or hydrogenation process including a procedure for supplying hydrogen therefor.

An important factor in the hydrogenation of hydrocarbon oils for the production of gasoline and other products on a commercial scale is the supply of hydrogen necessary for use in the process. There are certain standard methods of preparing hydrogen on a large scale, one of which is the use of the conventional steam-coke reaction used for the production of generator gas comprising a mixture of hydrogen and carbon monoxide. The disadvantage of using such a gas is that the carbon monoxide is either undesirable in the hydrogenation operation or constitutes an excess load in the hydrogenation units.

I have devised a procedure and an apparatus for separating a hydrogen fraction and supplying it to the hydrogenation operation. In accordance therewith I provide a barrier diffusion membrane or unit, or a plurality of such units and pass the hydrogen mixture from which the hydrogen is to be selectively removed in contact therewith under conditions adapted to diffuse the hydrogen as distinguished from other gases in the mixture, such as carbon monoxide. The gas fraction relatively high in hydrogen content is then used in the hydrogenation process.

An important feature of my invention is the provision of an improved barrier diffusion unit which is very effective for the separation of hydrogen by fractional diffusion from a gaseous mixture. My improved diffusion unit comprises a porous ceramic tube or plate, or a perforated metal or screen tube or plate as a support, having thereon a layer of aerogel which selectively diffuses hydrogen at a rate which will permit the use of the apparatus in industrial operations on a commercial scale. Many types of barrier membranes have been suggested and provided, but for the most part they diffuse hydrogen very slowly, or are not adapted for use in commercial scale operations. Aerogels of the type used in my process and apparatus have a barrier density of from 0.1 to 0.8, and are advantageously prepared in accordance with the procedure described in detail in my Patent No. 2,330,640.

In general, metallic compounds or mixtures thereof which form aquagels, for example oxides of silicon, aluminum, zirconium, and the like, may be converted into aerogels.

These materials, herein designated "aerogels," are substantially dehydrated gels derived in a coherent expanded condition from the corresponding hydrous gels by the removal of the liquid constituent therefrom without permitting the usual very substantial shrinking of the gel structure which occurs in the production of aquagels. For instance, the water of the aqueous solution in which the hydrous gel is originally formed may be replaced by another liquid which is completely miscible with the water but which has a critical temperature such that it may be expelled from the gel as a gas. Likewise, this displacement of water may be accomplished by employing a series of liquids each successively replacing the succeeding liquid but having progressively lower critical temperatures so that the last liquid of the series may be finally expelled as a gas.

In the preparation of the aerogels, instead of expelling the water from the hydrous gels by ordinary drying, the water is removed by first draining off the excess water and causing methyl alcohol or a similar solvent such as acetone, propane or the like to percolate through the gel until no further water appears in the effluent solvent. The alcohol-water mixture may be passed from the percolator to a fractionating still for separating the alcohol from the water and the water-free alcohol returned to the percolator.

The gel in which the water has been completely replaced by the alcohol is then placed in a pressure-bomb in which it is still submerged in alcohol. The bomb is sealed and heated so that the critical pressure of the alcohol is rapidly exceeded. The heating is continued until the critical temperature of the alcohol is reached. The vapors are then slowly released from the bomb while the temperature of the bomb's contents is maintained in excess of the critical temperature of the alcohol. When all of the gas has been released, the bomb is cooled and the resulting gel removed.

In this dehydrating process the gel loses only about 20% of its original volume. The product is extremely porous and has an exceptionally low apparent gravity. It usually has a brownish color due to the presence of reaction products of the alcohol. This gel is then calcined at a temperature of 1200° F. for 6¾ hours during which operation the brown discoloration completely disappears, leaving a white product herein designated "aerogel."

As an illustrative example of my process, I carry out a hydrogenation or hydrocracking operation in accordance with conventional procedure by heating a hydrocarbon oil stock, as for example, a gas oil, to a cracking temperature of from 950° to 1100° F., and introduce it, together with a suitable proportion of hydrogen containing gas, into a catalytic reaction zone in contact with a conventional hydrocracking catalyst. The operation is advantageously carried out at high pressures of from 1000 to 2000 lbs. per sq. inch. In this process the hydrogen supplied to the cracking zone is taken from one or more barrier diffusion units of the type described above so that the hydrogen containing gas will be substantially free of constituents such as carbon monoxide, or may contain only relatively low percentages of such constituents.

Barrier diffusion units in general do not make a complete separation of gases, and I therefore may use barrier diffusion units in series so that, for example, in processing a generator gas comprised mainly of hydrogen and carbon monoxide, the first fractional diffusion step will produce a gas which still contains an appreciable proportion of carbon monoxide, such as 15 mol percent. This gas is then subjected to a second or even a third fractional diffusion operation so that the final gas will contain only a few percent of carbon monoxide or gases other than hydrogen.

In my process, therefore, I may use industrial gases containing hydrogen, such as the generator gas referred to, and separate the hydrogen from the gaseous mixture by fractional diffusion with my improved barrier diffusion units, and utilize the resulting gas high in hydrogen content in the hydrogenation operation.

Figure 2:
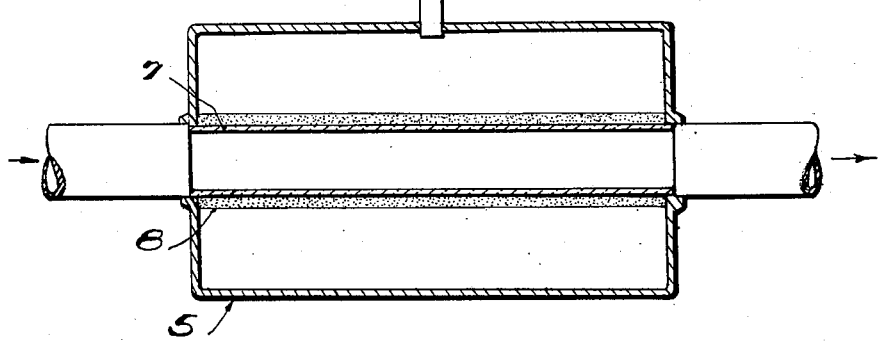

In the description of my invention reference is had to the accompanying drawing, in which:

Fig. 1 is a vertical sectional view of an apparatus utilizing a perforated metal plate and aerogel barrier, and Fig. 2 is a vertical sectional view of an apparatus employing a ceramic tube and aerogel barrier.

In making the barrier diffusion units 5 I may take porous ceramic or perforated metal plates 6 or tubes 7 through which gases pass rapidly and apply an exterior layer 8 of the aerogel thereon, this layer being molded or pressed thereon in accordance with the conventional procedure referred to in my patent for pelleting such materials. On the other hand, the layer may be provided on the ceramic tube or plate during the process of making the aerogel from the aquagel. The layer 8 may be made from about $\frac{1}{32}$ to $\frac{1}{8}$ inch in thickness.

The tubes or plates are mounted in parallel, for example, to provide a unit of adequate size, in a suitable chamber through which the gas mixture to be fractionated is passed. Provision is made for withdrawing the hydrogen rich fraction from the interior of the tubes or from the opposite side of the plates from that to which gas is supplied.

As stated above, two or more of the fractional diffusion units may be operated in series so that the hydrogen rich gas from one unit is passed to a succeeding unit. A parallel operation may also be provided in which the hydrogen containing gas being fractionated, is passed through a plurality of units in series until the gas contains such a low content of hydrogen as to make the operation impracticable. This gas from which the hydrogen is removed, is of course not wasted since it is usually a fuel gas and may therefore be burned. On the other hand, the resulting gas which may be substantially free of hydrogen, and which in the example referred to would be carbon monoxide, may be used in synthetic process for the production of hydrocarbons in accordance with well-known procedure.

The tail gases removed in the hydrocracking operation described above, or in any hydrogenation operation, may contain appreciable quantities of hydrogen as well as other gases, and this gas mixture, preferably free of readily condensable constituents, may be sent to a separate barrier diffusion unit or units of the type described above for the segregation of the hydrogen, or such gas which will be substantially free of carbon monoxide or other undesirable gases may be cycled directly to the hydrocracking unit.

I claim:

A barrier diffusion unit for the separation of a hydrogen-rich gas relatively free from undesirable gases from a gas mixture of lower hydrogen concentration by fractional diffusion through a barrier diffusion membrane comprising a porous supporting member, and a strong and coherent layer of a metal oxide aerogel molded on said porous supporting member, the metal of said metal oxide aerogel being selected from the group consisting of silicon, aluminum and zirconium, said coherent layer having a barrier density of from 0.1 to 0.8 and a thickness in the range of $\frac{1}{32}$ to $\frac{1}{8}$ inch, said coherent layer providing pores for the selective diffusion of hydrogen.

JOHN WATSON TETER.

REFERENCES CITED

The following references are of record in the file of this patent:

UNITED STATES PATENTS

| Number | Name | Date |
|---|---|---|
| 1,124,347 | Snelling | Jan. 12, 1915 |
| 1,174,631 | Snelling | Mar. 7, 1916 |
| 1,498,097 | Hertz | June 17, 1924 |
| 1,922,499 | Pier et al. | Aug. 15, 1933 |
| 1,934,031 | Boyer | Nov. 7, 1933 |
| 2,147,109 | Sander | Feb. 14, 1939 |
| 2,317,803 | Reeves et al. | Apr. 27, 1943 |
| 2,330,640 | Teter | Sept. 28, 1943 |
| 2,334,159 | Friedman | Nov. 9, 1943 |
| 2,334,872 | Friedman | Nov. 23, 1943 |
| 2,437,422 | Dunham | Mar. 9, 1948 |

FOREIGN PATENTS

| Number | Country | Date |
|---|---|---|
| 5,691 | Great Britain | Feb. 2, 1911 |
| 452,764 | Great Britain | Aug. 28, 1936 |

OTHER REFERENCES

Publications, Clouds and Smoke, W. E. Gibbs, published by J. and A. Churchill, 1924.